3,644,342
OZONOLYSIS OF 2-HYDROXY-3-OXO-$\Delta^{1,4}$ STEROIDS

Robert J. Chorvat, Raphael Pappo, and Mike G. Scaros, Arlington Heights, Ill., assignors to G. D. Searle & Co., Chicago, Ill.
No Drawing. Filed May 5, 1969, Ser. No. 821,948
Int. Cl. C07c 173/00
U.S. Cl. 260—239.55          9 Claims

ABSTRACT OF THE DISCLOSURE

Ozonolysis of 2-hydroxy-3-oxo-$\Delta^{1,4}$ steroids results in A-nor-1,2-seco aldehydo acids, which intermediates are useful in the manufacture of pharmacologically active 2-oxa-3-oxo-$\Delta^4$ steroids.

---

The present invention is concerned with a novel process for the conversion of 2-hydroxy-3-oxo-$\Delta^{1,4}$ steroids represented by the following partial structural formula

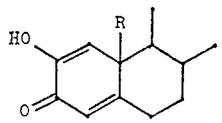

wherein R represents an optionally substituted methyl group, to the corresponding A-nor-1,2-seco aldehydo acids denoted by the following partial structural formula

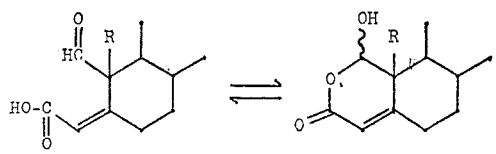

As shown, those aldehydo acids are in equilibrium with the corresponding lactol form. The latter aldehydo acids are useful as precursors of the corresponding pharmacologically active 2-oxa-3-oxo steroids of the following partial structural formula

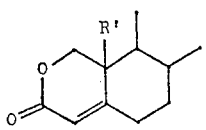

wherein R' is hydrogen or a methyl radical. The members of the androstane series, as is disclosed in U.S. Pats. 3,128,283 and 3,246,014, are, respectively, potent anabolic and potent progestational agents. Those agents are specifically exemplified by 17β-hydroxy-2-oxaandrost-4-en-3-one,
17β-hydroxy-17α-methyl-2-oxaandrost-4-en-3-one,
17α-ethynyl-17β-hydroxy-2-oxaandrost-4-en-3-one,
17α-ethynyl-17β-hydroxy-2-oxaestr-5(10)-en-3-one and
17α-ethynyl-17β-hydroxy-2-oxaestr-4-en-3-one.

In the pregnane family the 2-oxa-3-oxo-$\Delta^4$ derivatives also, as is disclosed in U.S. Pat. 3,080,381, exhibit potent progestational activity. Specific examples of those progestational agents are 2-oxapregn-4-ene-3,20-dione,
17α-acetoxy-2-oxapregn-4-ene-3,20-dione,
6α-methyl-2-oxapregn-4-ene-3,20-dione,
17α-acetoxy-6α-methyl-2-oxapregn-4-ene-3,20-dione and
17α-acetoxy-6-methyl-2-oxapregna-4,6-diene-3,20-dione.

The derivatives of the cholestane family are hypocholesterolemic agents in view of their ability to reduce plasma cholesterol levels. An example of that series is 2-oxa-cholest-4-en-3-one.

The instant 2-hydroxy-3-oxo-$\Delta^{1,4}$ intermediates are conveniently produced by oxygenation of the corresponding 3-oxo compounds represented by the following partial structural formula

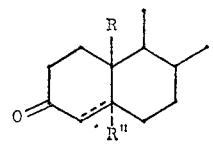

wherein R is as described hereinbefore, the dotted line and the R" group indicate either the presence of a 4,5 double bond or of a group at the 5-position, readily removable to afford that linkage. Suitable "leaving groups," are for example, halogen, as typified by bromo and chloro, and alkanoyloxy, as typified by acetoxy. In that oxygenation process, either pure oxygen gas or atmospheric oxygen may be utilized. The reaction proceeds more rapidly, however, as the concentration of oxygen is increased. For optimum yields it is preferred that a strongly alkaline reagent be present. Suitable reagents are alkali metal and alkaline earth metal alkoxides such as potassium tertiary-butoxide, sodium ethoxide, potassium ethoxide, sodium methoxide and magnesium ethoxide; alkali metal hydroxides such as potassium hydroxide and sodium hydroxide and quaternary ammonium hydroxides such as benzyl trimethyl ammonium hydroxide. Suitable solvents are the alkanols corresponding to those alkoxides. Co-solvents such as benzene, dioxane and pyridine may be utilized in the instances when increased solubility is desired. The process is conveniently conducted at pressures as low as one atmosphere and at temperatures at or near room temperature. A specific example of this process is the reaction of 5α-acetoxy-17β-benzoyloxy-6β,19-epoxy-androstan-3-one in tertiary-butyl alcohol with oxygen gas at several atmospheres pressure in the presence of potassium tertiary-butoxide and a catalytic quantity of hexamethylphosphoramide, thus affording 6β,19-epoxy-2,17β-dihydroxyandrosta-1,4-dien-3-one.

A method particularly convenient for the manufacture of the intermediate 2-hydroxycholestra-1,4-dien-3-one involves ozonolysis of 2-hydroxymethylenecholest-4-en-3-one, which compound is prepared by the reaction of cholest-4-en-3-one with ethyl formate. Ozonolysis of the 2-hydroxymethylene derivative is carried out in the usual manner. The yield is improved by the addition of dimethyl sulfide, that substance acting as a scavenger of the hydroperoxide intermediate. Improvement in the yield results from diminution of the amounts of by-products formed.

The instant process involves ozonolysis of the latter starting materials and is preferably conducted at temperatures between —70 and 30° C. in an organic solvent medium consisting of an inert non-polar solvent and optionally including also a polar solvent. Typical non-polar solvents are methylene chloride, chloroform, carbon tetrachloride and ethyl acetate, while suitable polar solvents comprise the family of lower alkanols, i.e. methanol, ethanol, tertiary-butyl alcohol, etc. Preferably a quantity of ozone slightly in excess of one mole is used, the presence of excess reagent being detected by its characteristic blue color.

As indicated hereinbefore, the instant ozonolysis process is broadly applicable to steroids of the androstane, pregnane and cholestane families. Other functional groups in the molecule are generally not affected, with the exception of olefinic linkages which may be similarly ozonolyzed but most probably at a considerably slower rate. This process is advantageous over those of the prior art in a number of aspects. The method described in U.S. Pat. 3,128,283 for the production of 1,2-seco A-nor aldehydro acids thus involves the use of the osmium tetroxide and lead tetraacetate reagents. These reagents are not only expensive, but, in addition, osmium tetroxide is extremely toxic. Vapors of that material thus cause severe damage to the eyes, respiratory tract and to the skin. The reaction time involved in the present process is much shorter than those of the prior art thus further contributing to the lower cost of this method. The yield obtained are furthermore far superior so that the present method is much more economical. There are also no excess reagents to dispose of in this process. This ozonolysis process is specifically exemplified by the reaction of 6β,19-epoxy-2,17β - dihydroxyandrosta - 1,4-dien-3-one with ozone in ethyl acetate solution to afford 6β,19-epoxy-17β-hydroxy-1-oxo-1,2-seco-A-norandrost-3-en-2-oic acid.

The instant 2-hydroxy-3-oxo-Δ¹,⁴ intermediates are alternatively produced by the methods described in U.S. Pat. 2,948,740. As is disclosed there, 2-hydroxypregna-1,4-diene-3,20-dione, for example, is produced by oxidation of 2α-hydroxypregn-4-ene-3,20-dione with bismuth trioxide in acetic acid.

The aforementioned 3-oxo compounds represented by the partial structural formula shown below

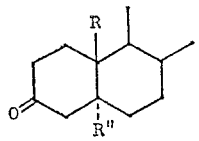

wherein R'' is a "leaving group" such as halo or alkanoyloxy and R is as hereinbefore defined are typified by 5α-acetoxy-17β-benzoyloxy-6β,19-epoxyandrostan-3-one. The latter substance is conveniently obtained by a series of reactions starting with 3β,5α-diacetoxy-6β,19-epoxyandrostan-17-one. The latter substance is reduced, typically with sodium borohydride in methanol, to afford 6β,19-epoxyandrostane-3β,5α-17β-triol 3,5-diacetate, which is acylated with benzoyl chloride in pyridine, thus affording 6β,19-epoxyandrostane-3β,5α,17β-triol 3,5-diacetate, 17-benzoate. Selective hydrolysis with methanolic hydrogen chloride results in 6β,19-epoxyandrostane-3β,5α,17β-triol 5-acetate, 17-benzoate, which is oxidized with chromic acid to yield the desired 5α-acetoxy-17β-benzoyloxy-6β,19-epoxyandrostan-3-one.

The instant 2-oxa-3-oxo-Δ⁴ steroids are useful also as intermediates to other pharmacologically active compounds. The aforementioned 6β,19-epoxy 17β-hydroxy 2-oxaandrost-4-en-3-one is thus acylated with acetic anhydride and pyridine to afford the corresponding 17-acetate, which is reduced with zinc dust and cupric acetate in acetic acid thus producing 17β-acetoxy-19-hydroxy-2-oxaandrost-5-en-3-one. Chromic acid oxidation of that substance in acetone affords 17β-acetoxy-10β-carboxy-2-oxaestr-5-en-3-one, which is decarboxylated by heating in aqueous pyridine, thus producing 17β-acetoxy-2-oxaestr-5(10)-en-3-one. The latter substance, as is disclosed in U.S. Pat. 3,280,149, is a hormonal agent as is indicated by its anabolic activity.

The invention will appear more fully from the examples which follow. These examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight except where otherwise noted.

EXAMPLE 1

To a solution of 100 parts of 3β,5α - diacetoxy-6β,19-epoxyandrostan-17-one in 800 parts of methanol, cooled to approximately 5°, is added portionwise over a period of about 10 minutes, 6 parts of sodium borohydride. The heterogeneous mixture is then stirred at approximately 5° for about 90 minutes and the excess reagent is destroyed by the addition of glacial acetic acid. Removal of the solvent by distillation under reduced pressure affords a residual solution, which is diluted with water. The precipitated white solid is purified by recrystallization from aqueous ethanol to yield pure 6β,19 - epoxyandrostane-3β,5α,17β - triol, 3,5 - diacetate, melting at about 191–192.5°. This compound is characterized further by infrared absorption peaks, in chloroform, at about 2.76, 5.77 and 8.00 microns. Nuclear magnetic resonance maxima are observed, in chloroform, at about 47, 120, 127 and 228 hertz.

EXAMPLE 2

To a solution of 50 parts of 6β,19 - epoxyandrostane-3β,5α,17β - triol 3,5 - diacetate in 450 parts of pyridine is added, in one portion, 30 parts of benzoyl chloride. The resulting reaction mixture is stirred at room temperature for about 3 hours, then is diluted with about 1200 parts of water. The initially oily substance which separates solidifies upon standing, then is collected by filtration, washed with water and dried to afford the crude product. Recrystallization of that material from methanol yields 6β,19 - epoxyandrostane - 3β,5α,17β - triol 3,5-diacetate, 17-benzoate, melting at about 162–165°. Infrared absorption maxima are observed, in chloroform, at about 5.78 and 8.00 microns and nuclear magnetic resonance maxima, in deuterochloroform, at approximately 60, 123, 131, 232 and 445–500 hertz.

EXAMPLE 3

To 800 parts of methanol containing approximately 5 parts of anhydrous hydrogen chloride is added 55 parts of 6β,19 - epoxyandrostane - 3β,5α,17β - triol 3,5-diacetate, 17-benzoate and the resulting reaction mixture is stirred at room temperature for about 4 hours. At the end of that time the acidic mixture is neutralized by the addition of triethylamine, then is diluted with about 1000 parts of water. The resulting crude product is dried and purified by recrystallization from methanol to yield 6β,19-epoxyandrostane - 3β,5α,17β - triol 5 - acetate, 17 - benzoate, melting at about 212–214°. Infrared absorptions maxima are displayed, in chloroform, at about 2.78, 5.78, 5.82 and 7.80 microns while nuclear magnetic resonance peaks are observed in deuterochloroform at about 59, 121, 127, 227 and 435–490 hertz.

EXAMPLE 4

To a solution of 49 parts of 6β,19 - epoxyandrostane-3β,5α,17β - triol 5 - acetate, 17 - benzoate in 800 parts of acetone is added, at room temperature over a period of about 10 minutes, 31 parts by volume of an aqueous solution 8 N in chromium trioxide and 8 N in sulfuric acid. The resulting reaction mixture is stirred for about 15 minutes longer, at the end of which time the supernatant is separated by decantation. Dilution of that supernatant with water results in precipitation of the product, which is isolated by filtration, washed with water and dried to afford 5α - acetoxy-17β - benzoyloxy - 6β,19 - epoxydrostan-3-one, melting at about 218–219°. This compound displays infrared absorption maxima, in chloroform, at about 5.73, 5.82 and 7.80 microns and also nuclear magnetic resonance peaks at about 62, 126, 239 and 430–490 hertz.

EXAMPLE 5

Method A

To a solution of 44.4 parts of 5α-acetoxy-17β-benzoyloxy-6β,19-epoxyandrostan-3-one in 41.3 parts of tertiary-butyl alcohol containing 2.65 parts by volume of hexamethylphosphoramide is added 48.2 parts of potassium tertiary-butoxide and the resulting reaction mixture is shaken under several atmospheres of oxygen pressure for about 1 hour. The reaction mixture is then diluted with approximately 150 parts of water and allowed to stand at room temperature for about 16 hours, then is neutralized with dilute hydrochloric acid. That acidic mixture is then extracted with chloroform and the chloroform layer is separated, washed several times with water, dried over anhydrous sodium sulfate and stripped of solvent by distillation under reduced pressure, thus affording an oily residue. That material is dissolved in benzene and the benzene solution is washed with dilute aqueous sodium bicarbonate, then extracted with dilute aqueous sodium hydroxide. The latter alkaline extract is washed with chloroform, then is made acidic by the addition of dilute hydrochloric acid, thus affording the crude product as a precipitate. The latter acidic mixture is extracted with chloroform and the chloroform solution is washed with water, dried over anhydrous sodium sulfate and stripped of solvent by distillation under reduced pressure. The crude product obtained as a solid residue is purified by recrystallization from methanol, thus affording pure 6β,19-epoxy-2,17β - dihydroxyandrosta - 1,4 - dien-3-one, melting at about 199–201°. This compound exhibits infrared absorption maxima, in chloroform, at about 2.75, 2.90 and 6.03 microns and nuclear magnetic resonance peaks, in deuterochloroform, at about 53, 212, 219, 252, 259, 474 and 476 hertz. It is represented by the following structural formula

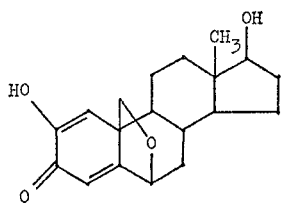

Method B

A mixture consisting of 1.52 parts of 6β,19-epoxy-17β-hydroxyandrost-4-en-3-one, 11 parts by volume of 0.73 N potassium tertiary-butoxide in tertiary-butyl alcohol and 0.11 part of hexamethylphosphoramide is shaken in an oxygen atmosphere under one atmosphere pressure until one molecular equivalent of oxygen has been absorbed. The reaction mixture is diluted with approximately 60 parts of water, then made acidic by means of dilute hydrochloric acid. Extraction of that acidic mixture with benzene affords an organic solution, which is extracted first with dilute aqeuous potassium bicarbonate, then with dilute aqueous sodium hydroxide. The latter extract is washed with chloroform, then acidified by the addition of dilute hydrochloric acid and the latter acidic solution is extracted with chloroform. The chloroform extract is washed with water, dried over anhydrous sodium sulfate and stripped of solvent under reduced pressure to afford 6β,19-epoxy-2,17β-dihydroxyandrosta-1,4 - dien - 3 - one, identical with the product of Method A.

EXAMPLE 6

A stream of ozone is passed through a solution containing one part of 6β,19-epoxy-2,17β-dihydroxyandrosta-1,4-dien-3-one in 81 parts of ethyl acetate at approximately −65° until a slight excess of ozone is present, as evidenced by the blue color of the solution. At the end of that time excess ozone is purged from the reaction mitxure with nitrogen and the solution is allowed to warm to room temperature. Removal of the solvent by distillation under reduced pressure affords 6β,19-epoxy-17β-hydroxy-1-oxo-1,2-seco-A-norandrost-3-en-2-oic acid as an oil.

The latter aldehydo acid is dissolved in chloroform and the resulting solution is extracted several times with dilute aqueous sodium bicarbonate. To the combined alkaline extract is added 0.5 part of sodium borohydride and the reaction mixture is stirred at room temperature for about 3 hours. The alkaline solution is then made acidic by the addition of dilute hydrochloric acid and is heated to effect lactonization. The resulting mixture is extracted several times with ethyl acetate and the combined extracts are washed successively with dilute aqueous sodium bicarbonate and water, then dried over anhydrous sodium sulfate and distilled to dryness under reduced pressure. The resulting crude product is purified by recrystallization from benzene, thus affording 6β,19-epoxy-17β-hydroxy-2-oxaandrost-4-en-3-one, melting at about 201–202°. This compound displays infrared absorption maxima, in chloroform, at about 2.75 and 5.80 microns and nuclear magnetic reasonance peaks at about 49, 210–290 and 347 hertz.

EXAMPLE 7

To a mixture of 130 parts of acetic anhydride and 260 parts of pyridine is added 26 parts of 6β,19-epoxy-17β-hydroxy-2-oxaandrost-4-en-3-one and the resulting reaction mixture is stirred until homogeneous. It is then stored at room temperature for about 16 hours, at the end of which time approximately 50 parts of ice is added while the temperature is maintained below 40°. The resulting aqueous mixture is distilled to dryness under reduced pressure and the resulting residue is dissolved in benzene. The benzene solution is washed successively with dilute hydrochloric acid and water until neutral, then is washed with aqueous sodium chloride and finally dried over anhydrous sodium sulfate. The solvent is removed by distillation under reduced pressure to afford 17β-acetoxy-6β,19-epoxy-2-oxaandrost-4-en-3-one, melting at about 182–185°.

EXAMPLE 8

To a solution of 75 parts of 17β-acetoxy-6β,19-epoxy-2-oxaandrost-4-en-3-one in 3600 parts of ethanol is added successively 1575 parts of glacial acetic acid, 1500 parts of water, 750 parts of zinc dust and 150 parts of powdered cupric acetate. The resulting reaction mixture is heated at the reflux temperature with vigorous stirring for about 1 hour, then is filtered while hot through a layer of diatomaceous earth. The filter cake is washed with aqueous ethanol and the filtrate and washings are combined, then partially concentrated by distillation under reduced pressure. The resulting slurry is extracted with chloroform and the chloroform solution is washed with saturated aqueous sodium chloride, dried over anhydrous sodium sulfate and stripped of solvent by distillation under reduced pressure. The resulting crude product is purified by recrystallization from benzene-hexane, thus affording 17β-acetoxy-19-hydroxy-2-oxaandrost-5-en-3-one.

EXAMPLE 9

To a solution of 259.5 parts of 17β-acetoxy-19-hydroxy-2-oxaandrost-5-en-3-one in 2400 parts of acetone is added, over a period of about 25 minutes at 8–10°, 630 parts by volume of an aqueous solution, 8 N in chromium trioxide and 8 N in sulfuric acid. The resulting reaction mixture is stirred for about 1 hour at that temperature, then is diluted with approximately 400 parts of isopropyl alcohol. The mixture is partially concentrated under reduced pressure and the resulting residue is partitioned between water and methylene chloride. The methylene chloride solution is washed several times with water until neutral, then with saturated aqueous sodium chloride. That solution is then dried over anhydrous sodium sulfate, concentrated partially under reduced pressure and diluted with hot benzene. The resulting solution is allowed to cool to room temperature in order to allow crystallization to take place. The resulting crystals are collected by filtration and dried, thus affording 17β-acetoxy-10β-carboxy-2-oxaandrost-5-en-3-one, melting with decomposition at about 192–196°.

EXAMPLE 10

A solution of 170 parts of 17β-acetoxy-10β-carboxy-2-oxaestr-5-en-3-one in 1690 parts of pyridine, under nitrogen, is warmed with stirring to approximately 40°, at which point 1690 parts of water is added and the resulting reaction mixture is heated at the reflux temperature for about 30 minutes. The mixture is then cooled and poured with stirring into 1500 parts of ice water. The precipitate which forms is collected by filtration and dried, thus affording 17β-acetoxy-2-oxaestr-5(10)-en-3-one, which compound melts at about 126–128°.

EXAMPLE 11

To a solution of 38.4 parts of cholest-4-en-3-one and 46 parts of ethyl formate in 528 parts of benzene is added portionwise 6 parts of sodium hydride. Approximately 0.2 part of methanol is then added and the reaction mixture is stirred at room temperature for about 16 hours. At the end of that time the excess reagent is destroyed by the addition of a small quantity of methanol and that solution is made acidic by the addition of dilute hydrochloric acid. The resulting two-phase system is stirred vigorously in order to effect hydrolysis of the precipitated sodium salt, then is separated. The aqueous layer is extracted with ether and the extracts are combined with the benzene layer. The resulting solution is washed with water, dried over anhydrous sodium sulfate and stripped of solvent by distillation under reduced pressure. The resulting oily residue is recrystallized from ethyl acetate, thus affording 2 - hydroxymethylenecholest - 4 - en - 3 - one, melting at about 100–105°. Further purification is effected by an additional recrystallization from ethyl acetate.

EXAMPLE 12

A stream of ozone is passed through a solution containing 9 parts of 2 - hydroxymethylenecholest - 4 - en-3-one, 536 parts of methylene chloride and 200 parts of methylene chloride and 200 parts of pyridine at —65° until somewhat more than one equivalent has been absorbed. That mixture is then allowed to warm to room temperature and the solvent is removed by distillation under reduced pressure. The resulting oily residue is dissolved in benzene, then is washed successively with dilute hydrochloric acid, dilute aqueous sodium bicarbonate and water, dried over anhydrous sodium sulfate and stripped of solvent under reduced pressure. That oily residue is purified by adsorption on a silica gel chromatographic column followed by elution with benzene and benzene-ethyl acetate solutions, thus affording 2 - hydroxycholesta-1,4-dien-3-one, which is purified by recrystallization from ethanol to afford the pure substance, melting at about 106.5–107.5°. This compound exhibits an ultraviolet absorption maximum at about 255 millimicrons with a molecular extinction coefficient of about 14,800, infrared absorption peaks, in chloroform, at about 2.90 and 6.10 microns and nuclear magnetic resonance peaks at about 44, 49, 55, 75, 371 and 379 hertz.

From the foregoing eluants there is obtained also 2,3-secocholest - 4 - ene - 2,3 - dioic acid anhydride, which when recrystallized from ethanol melts at 99.5–101° and exhibits infrared absorption maxima, in chloroform, at about 5.60, 5.78 and 6.14 microns an ultraviolet absorption maximum at about 234 millimicrons with a molecular extinction coefficient of about 7900 and also nuclear magnetic resonance peaks at about 43, 49, 55, 75, 154–183 and 355 hertz. There is obtained, in addition, from later eluants 5β - hydroxy - 3 - oxa - A - norcholestan - 2 - one, which after recrystallization from ethyl acetate melts at about 165–166.5°, displays infrared absorption maxima, in chloroform, at about 2.80 and 5.63 microns and exhibits nuclear magnetic resonance maxima at about 52, 55, 58, 67, 148 and 154 hertz.

EXAMPLE 13

0.63 part of 2 - hydroxypregna - 1,4 - diene - 3,20 - dione is ozonolyzed by the procedure described in Example 6. The resulting reaction mixture is allowed to stand at room temperature for about 16 hours, then is stripped of solvent by distillation under reduced pressure. The residue containing 1,20 - dioxo - 1,2 - seco- A - norpregn - 3 - en-2-oic acid is extracted with chloroform and the extract is added to a solution containing 0.1 part of sodium hydroxide and 0.5 part of sodium borohydride in 10 parts of water. That reaction mixture is stirred at room temperature for 3–4 hours, at the end of which time the two layers are separated and the aqueous portion is extracted with fresh chloroform. The combined extracts are washed with water, dried over anhydrous sodium sulfate and stripped of solvent under reduced pressure. The resulting residue containing 20 - hydroxy - 2 - oxapregn - 4 - en-3-one is dissolved in about 6 parts of acetone and a slight excess of an aqueous solution, 8 N in chromium trioxide and 8 N in sulfuric acid, is added. That reaction mixture is stirred for about 15 minutes, then treated with isopropyl alcohol to destroy the excess oxidant. Dilution with water results in precipitation of the product, which is extracted with chloroform. The extract is washed with water, dried over anhydrous sodium sulfate and stripped of solvent usder reduced pressure, thus affording 2-oxapregn-4-ene-3,20-dione. After recrystallization from isopropyl alcohol, that product melts at about 165–166°, exhibits an ultraviolet absorption maximum at about 222 millimicrons with a molecular extinction coefficient of about 14,000, displays infrared absorption peaks, in chloroform, at about 5.80, 5.85 and 9.47 microns and also nuclear magnetic resonance peaks at about 41, 73, 128, 232–262 and 341 hertz.

EXAMPLE 14

The substitution of an equivalent quantity of 2-hydroxycholesta-1,4-dien-3-one in the ozonolysis procedure of Example 6 results in 1 - oxo - 1,2 - seco - A - norcholest-4-en-3-oic acid and 2 - oxacholest - 4 - en - 3 - one. The latter compound, after recrystallization from ether-pentane melts at about 126–127°, exhibits infrared absorption maxima at about 5.80 and 6.13 microns and nuclear magnetic resonance peaks at about 42, 48, 54, 72, 232–260 and 339 hertz.

What is claimed is:

1. The process which comprises contacting a 2-hydroxy-3-oxo-$\Delta^{1,4}$ steroid with ozone and isolating the A-nor-1,2-seco aldehydo acid formed.

2. The process of claim 1, wherein the 2-hydroxy-3-oxo-$\Delta^{1,4}$ steroid is 6β,19 - epoxy - 2,17β - dihydroxyandrosta-1,4-dien-3-one and the A-nor-1,2-seco aldehydo acid is 6β,19 - epoxy - 17β - hydroxy - 1 - oxo - 1,2 - seco - A-norandrost-3-en-2-oic acid.

3. The process of claim 1, wherein the 2-hydroxy-3-oxo-$\Delta^{14}$ steroid is 2 - hydroxypregna - 1,4 - diene - 3,20-dione and the A - nor - 1,2 - seco aldehydo acid is 1,20-dioxo-1,2-seco-A-norpregn-3-en-2-oic acid.

4. The process of claim 1, wherein the 2 - hydroxy-3-oxo-$\Delta^{1,4}$ steroid is 2-hydroxycholesta - 1,4 - dien - 3 - one and the A-nor-1,2-seco aldehydo acid is 1-oxo-1,2-seco-A-norcholest-3-en-2-oic acid.

5. 6β,19 - epoxy - 2,17β - dihydroxyandrosta - 1,4-dien-3-one.

6. The process which comprises contacting a 2-hydroxy-3-oxo-$\Delta^{1,4}$ steroid with ozone and then contacting the resulting A-nor-1,2-seco aldehydo acid with a metallic hydride reducing agent and isolating the 2-oxa-3-oxo-$\Delta^4$ steroid.

7. The process of claim 6, wherein the 2-hydroxy-3-oxo-$\Delta^{1,4}$ steroid is 6β,19 - epoxy - 2,17β - dihydroxyandrosta - 1,4 - dien - 3 - one, the A - nor - 1,2 - seco aldehydo acid is 6β,19 - epoxy - 17β - hydroxy - 1 - oxo-1,2 - seco - A - norandrost - 3 - en - 2 - oic acid and the 2 - oxa - 3 - oxo - Δ⁴ steroid is 6β,19 - epoxy - 17β - hydroxy-2-oxaandrost-4-en-3-one.

8. The process of claim 6, wherein the 2-hydroxy-3-oxo-Δ$^{1,4}$ steroid is 2 - hydroxypregna - 1,4 - diene - 3,20-dione, the A - nor - 1,2 - seco aldehydo acid is 1,20-dioxo - 1,2 - seco - A - norpregn - 3 - en - 2 - oic acid and the 2 - oxa - 3 - oxo - Δ⁴ steroid is 20 - hydroxy - 2-oxapregn-4-en-3-one.

9. The process of claim 6, wherein the 2 - hydroxy - 3-oxo-Δ$^{1,4}$ steroid is 2 - hydroxycholesta - 1,4 - dien - 3 - one, the A-nor-1,2-seco aldehydo acid is 1 - oxo - 1,2 - seco-A - norcholest - 3 - en - 2 - oic acid and the 2 - oxa-3-oxo-Δ⁴ steroid is 2-oxacholest-4-en-3-one.

References Cited
UNITED STATES PATENTS 3,246,014   4/1966   Jung et al. _____ 260—343.2

ELBERT L. ROBERTS, Primary Examiner

U.S. Cl. X.R.

260—343.2, 348, 514

UNITED STATES PATENT OFFICE
CERTIFICATE OF CORRECTION

Patent No. 3,644,342      Dated February 22, 1972

Inventor(s) Robert J. Chorvat, Raphael Pappo & Mike G. Scaros

It is certified that error appears in the above-identified patent and that said Letters Patent are hereby corrected as shown below:

Column 7, lines 42,43, "chloride and 200 parts of methylene chloride and 200 parts of pyridine" should be -- chloride and 200 parts of pyridine --.

Column 8, line 54, "oxo-1,4" should be -- oxo-$\Delta^{1,4}$ --.

Column 8, line 59, "$\Delta^{14}$" should be -- $\Delta^{1,4}$ --.

Column 8, line 66, "epoxy" should be -- Epoxy --.

Signed and sealed this 1st day of August 1972.

(SEAL)
Attest:

EDWARD M. FLETCHER, JR.      ROBERT GOTTSCHALK
Attesting Officer      Commissioner of Patents